US010095700B2

(12) United States Patent
Narayanasamy et al.

(10) Patent No.: US 10,095,700 B2
(45) Date of Patent: Oct. 9, 2018

(54) PERSISTENT FILE HANDLE OBJECT CONTAINER MEMORY EXPIRY

(71) Applicant: HGST, Inc., San Jose, CA (US)

(72) Inventors: Senthilkumar Narayanasamy, San Jose, CA (US); Koushik Rajagopal, Milpitas, CA (US); Praveen Kumar Loganathan, Milpitas, CA (US)

(73) Assignee: HGST, Inc., San Jose, CA (US)

( * ) Notice: Subject to any disclaimer, the term of this patent is extended or adjusted under 35 U.S.C. 154(b) by 0 days.

(21) Appl. No.: 15/409,276

(22) Filed: Jan. 18, 2017

(65) Prior Publication Data

US 2018/0203870 A1 Jul. 19, 2018

(51) Int. Cl.
*G06F 17/00* (2006.01)
*G06F 17/30* (2006.01)
*G06F 3/06* (2006.01)

(52) U.S. Cl.
CPC ........ *G06F 17/30117* (2013.01); *G06F 3/067* (2013.01); *G06F 3/0608* (2013.01); *G06F 3/0643* (2013.01); *G06F 3/0652* (2013.01); *G06F 17/30194* (2013.01)

(58) Field of Classification Search
CPC .. G06F 3/067; G06F 17/30117; G06F 3/0608; G06F 17/30194
USPC ................................................ 707/689, 813
See application file for complete search history.

(56) References Cited

U.S. PATENT DOCUMENTS

| 5,884,328 | A  | * | 3/1999  | Mosher, Jr. | ......... G06F 11/1662 707/E17.005 |
| 6,961,726 | B1 | * | 11/2005 | Eisenberg   | ......... G06F 17/30067 707/E17.01 |
| 9,462,039 | B2 | * | 10/2016 | George      | ................... H04L 67/06 |
| 2002/0152362 | A1 | * | 10/2002 | Cochran | ............. G06F 11/2064 711/162 |
| 2003/0115439 | A1 | * | 6/2003  | Mahalingam | ..... G06F 17/30079 712/1 |
| 2004/0193879 | A1 | * | 9/2004  | Sonoda      | ............. G06F 17/30067 713/165 |
| 2006/0010150 | A1 | * | 1/2006  | Shaath      | .............. G06F 17/30085 707/E17.01 |
| 2006/0184821 | A1 | * | 8/2006  | Hitz        | ...................... G06F 3/0607 714/6.1 |
| 2007/0028068 | A1 | * | 2/2007  | Golding     | ................ G06F 3/0605 711/170 |
| 2007/0276878 | A1 | * | 11/2007 | Zheng       | ................. G06F 11/1435 707/E17.01 |

(Continued)

*Primary Examiner* — Phong H Nguyen (57) ABSTRACT

A method for managing persistent file handles includes starting an expiry timer and creating a Persistent File Handle (PHDL) container for storing extended file attributes including, a generation number (GN), a share GN (SGN), a previous SGN, and a timeout max value for an expiry timer, where a SGN is a timestamp of a volume migration or an online creation in relation to the expiry timer. The method additionally includes creating a PHDL iterator to update the SGNs for every volume exported to clients, volumes created online or for a restarting of a network-share service on a server. The method further includes triggering a clean-up of stale PHDL containers from a server memory based on a difference of the new SGN and the previous SGN being greater than the timeout maximum number else preserving the PHDL object container and updating the well-known key value.

20 Claims, 8 Drawing Sheets

(56) References Cited

U.S. PATENT DOCUMENTS

| | | | |
|---|---|---|---|
| 2008/0271130 A1* | 10/2008 | Ramamoorthy | G06F 17/30171 |
| | | | 726/9 |
| 2010/0011383 A1* | 1/2010 | Abdul Kader Jailani | |
| | | | H04L 41/0846 |
| | | | 719/330 |
| 2010/0332563 A1* | 12/2010 | Fujikawa | G06F 17/30117 |
| | | | 707/813 |
| 2015/0066852 A1* | 3/2015 | Beard | G06F 17/30079 |
| | | | 707/625 |
| 2015/0127687 A1* | 5/2015 | Graves | G06F 17/30589 |
| | | | 707/803 |

* cited by examiner

PERSISTENT FILE HANDLE OBJECT CONTAINER MEMORY EXPIRY

BACKGROUND OF THE INVENTION

Solid-state arrays have moved the external controller-based storage array market from a relatively stagnant incrementally improving market with slow-changing dynamics to a progressive neoclassical market. Improvements in the dynamics of many factors—such as reduced storage administration, power, cooling, rack space, increased performance and density—have changed the accepted assumptions of the previous SAN storage array market. Many vendors design and develop their own custom solid-state solutions. Consequently, more vendors are offering alternate solid-state media form factors with denser and faster systems when they create their own NAND flash storage packaging. From a whole system perspective, the largest SSAs now scale to 3.9 PB, and next-generation SSD technology and interconnects will again redefine performance capabilities, creating demand for faster storage networks.

Neither the solid-state array, nor the storage array administrator is the bottleneck anymore; but network latency has become the challenge. This has extended the requirement and life span for 16 Gbps and 32 Gbps Fibre Channel SANs, as Ethernet-based networks and related storage protocols struggle to keep up. Many new vendors have entered the market who provide comprehensive service management, and along with many traditional storage vendors, they continue to transition their portfolios from HDD-based arrays to all solid-state arrays.

Therefore, an SSA that is two to three times more expensive to purchase becomes a cost-effective replacement for a hybrid or general-purpose array at increased utilization rates. With regard to performance, one SSD can typically replace multiple HDDs, combined with data reduction features and increased storage administrator productivity the price point at which SSA investment decisions are made is dropping rapidly. Redundant array of independent disks (RAID) rebuild times for high-capacity SSDs are also faster than for high-capacity HDDs. Therefore, as HDD storage capacities increase, so do HDD recovery times, and SSAs reduce the risk exposure during any media failure and recovery window. Use cases for SSAs are moving into analytics, file and object workloads, and some customers even use SSAs as backup targets to reduce backup and restore windows.

Price and ownership programs translate into very competitive purchase prices for buyers, but vendors are faced with challenges to becoming profitable as incumbent vendors discount to avoid losing market share and new vendors discount to attract new customers. Because the SSA market has expanded rapidly with SSD reliability being equal to or better than HDD arrays, and feature parity also equalizing, the competitive battle to differentiate has moved to ease of ownership, and remote and pre-emptive support capabilities.

In contrast to block and file I/O storage systems, when an object is stored in Object addressable data storage systems (OAS), the object is given a name that uniquely identifies it and that also specifies its storage location. This type of data access therefore may eliminate the need for a table index in a metadata store and it may not be necessary to track the location of data in the metadata. An OAS receives and processes access requests via an object identifier that identifies a data unit or other content unit rather than an address that specifies where the data unit is physically or logically stored in the storage system.

In OAS, a content unit may be identified using its object identifier and the object identifier may be independent of both the physical and logical locations where the content unit is stored. In other words, the object identifier does not control where the content unit is logically or physically stored. Thus, if a physical or logical location of a content unit changes, the identifier for access to the unit of content may remain the same. Thus, an application program may simply track the name and/or location of a file rather than tracking the block addresses of each of the blocks on disk that store the content.

Many storage systems have separate systems to de-duplicate and compress data and replication software is often added post system build. Server vendors have used available building blocks to slash server prices dramatically, yet storage incumbents continue to overcharge customers for their storage servers. Architectural complexity, non-integrated products, expensive proprietary networking protocols, cumbersome administration and licensing for every module of software are the norm and burden storage consumers with high prices and high maintenance.

Modern computing ecosystems rely on resilient data availability for most of their functions. This translates directly into failure-resilient storage systems, which have fostered the development of strategies in storage server solutions like clustering (multiple computers per file system), shared storage, and splitting of compute and file-system responsibilities. Simultaneously, the network file-system protocols like CIFS (Common Internet File System) and NFS (Network File System) have undergone modifications that allow applications running on remote clients to receive a seamless flow of data, irrespective of storage node failures at the server. This is primarily achieved by making the storage server cluster guarantee that once a client acquires a handle on a file by opening it, the cluster and not a specific node will honor client interactions for this file-handle. This guarantee has major implications to the manner in which client's file-handle data must be stored on a storage server.

In a traditional storage server, the storage host node, which services the client's request for opening a file, creates an in-memory context for the client's request to open the file and refers to it for all further client operations using the file-handle that it returns to the client as a part of an open response till the client relinquishes the file-handle, typically through a file-close.

This in-memory context, or client's file-handle info, can be grouped into the following categories. Mode of usage: The manner in which the client wishes to use the file, e.g. read, write, execute, delete etc. Mode of shared usage: The manner in which the client allows other clients to use this file concurrently. Locking information: The extent of the file over which the client wishes exclusive access. This state may also contain information about any soft-lock or opportunistic lock that the client holds for caching read and writes to the file locally. Any application specific context that the client wishes to save as opaque metadata for the lifetime of the file-handle.

For a failure-resilient storage system, this in-memory state, referred to as 'persistent-handle-info' or PHDL-info hereafter, must be made available to other nodes of the system, so that in the event of primary node failure, any other node in the storage cluster can serve the data to clients once the latter present their persistent-handles for reconnection. However, storing the persistent-handle-info for long time-intervals can cause considerable memory consumption on the storage server.

SUMMARY OF THE INVENTION

A method for managing persistent file handles includes starting an expiry timer and creating a Persistent File Handle (PHDL) container for storing extended file attributes including, a generation number (GN), a share GN (SGN), a previous SGN, and a timeout max value for an expiry timer, where a SGN is a timestamp of a volume migration or an online creation in relation to the expiry timer. The method additionally includes creating a PHDL iterator to update the SGNs for every volume exported to clients, volumes created online or for restarting of a network-share service on the server. The method further includes triggering a clean-up of stale PHDL containers from a server memory based on a difference of the new SGN and the previous SGN being greater than the timeout maximum number else preserving the PHDL container and updating the well-known key value.

A computer program product is also disclosed and includes a computer readable storage medium having computer useable instruction codes executable to perform operations for managing persistent file handles for a server to a client memory, the operations of the computer program product comprising the above steps.

A system for managing persistent file handles includes an expiry timer and a Persistent File Handle (PHDL) object container configured to store extended file attributes for a file based on the file's existence associated thereto, a client's permissions for the file and an absence of conflicts between the file and other open files. The system also includes a generation number (GN) register, a share GN (SGN) register, a previous SGN register, and a timeout max value register for the expiry timer, where each GN register stores a timestamp of a volume migration or an online creation in relation to the expiry timer. The system additionally includes a PHDL iterator configured to update the SGNs for every volume exported to clients, creation of the volume online or at a restarting of a network-share service on the server where each SGN relates to a well-known key value of the expiry timer stored therein. The system further includes a clean-up module configured to trigger a clean-up of stale PHDL object containers based on a difference of the new SGN and the previous SGN being greater than the timeout maximum number else configured for preserving the PHDL object container and updating the well-known key value.

Other aspects and advantages of embodiments of the disclosure will become apparent from the following detailed description, taken in conjunction with the accompanying drawings, illustrated by way of example of the principles of the disclosure.

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims herein and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'well-known' refers to a value stored in a register or a memory location available to or made known to all files within a server network. Also, the term 'generation number' refers to a number of times a volume of files in memory have been shared, a number of times the volume has been made available online and the number of times a network-share service has started up. The term 'migration' as used in the present disclosure refers to taking a dataset (share/volume) offline and bringing it back online.

Figure 1:
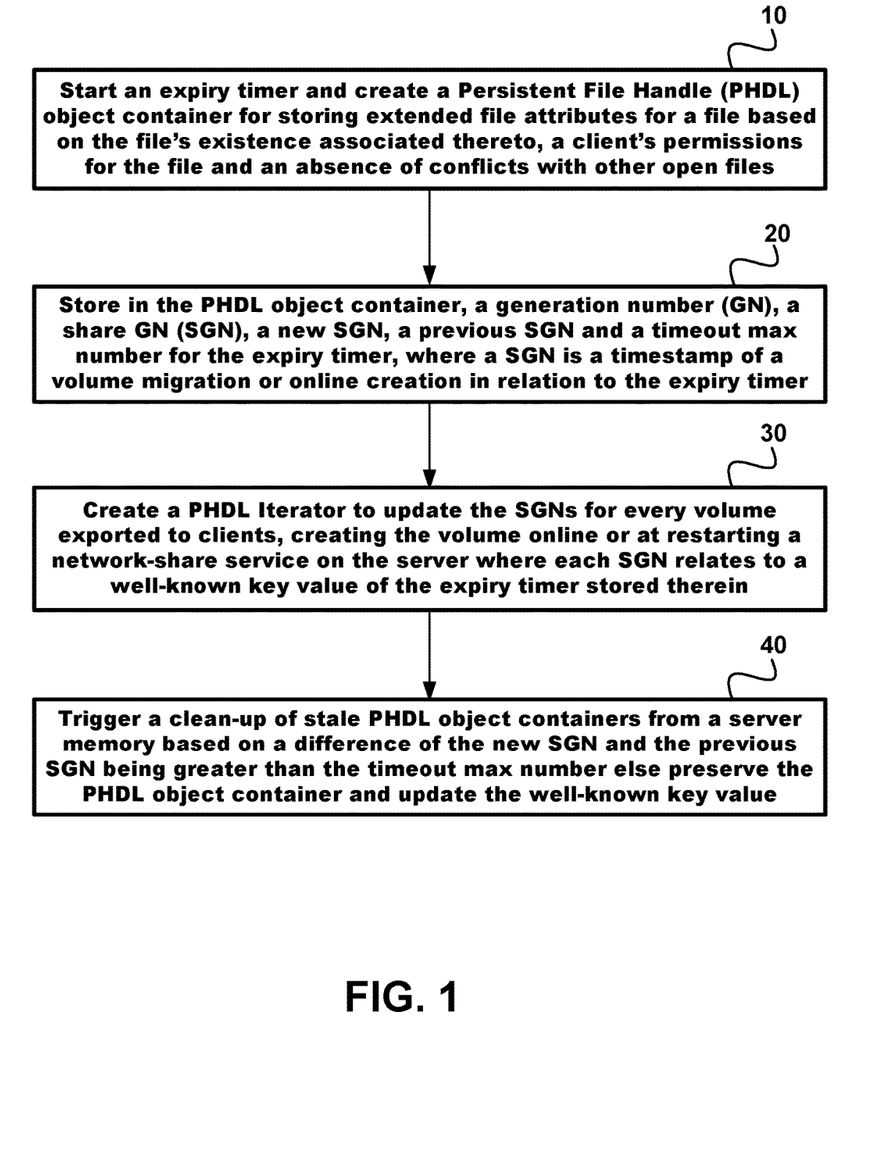
FIG. 1 is a flow chart of a method for managing persistent file handles for a server/client memory based on an expiry timer value and a difference of share generation numbers that trigger a clean-up of stale memory according to an embodiment of the present disclosure.

FIG. 1 is a flow chart of a method for managing persistent file handles for a server/client memory based on an expiry timer value and a difference of share generation numbers that trigger a clean-up of stale memory according to an embodiment of the present disclosure. The method includes 10 starting an expiry timer and creating a Persistent File Handle (PHDL) object container for storing extended file attributes based on the file's existence associated thereto, a client's permissions for the file and an absence of conflicts between the file and other open files. The method also includes 20 storing in the PHDL object container, a generation number (GN), a share GN (SGN), a new SGN, a previous SGN, and a timeout max value for the expiry timer, where a SGN is a timestamp of a volume migration or an online creation in relation to the expiry timer. The method additionally includes 30 creating a PHDL iterator to update the SGNs for every volume exported to clients, creation of the volume online or at a restarting of a network-share service on the server where each SGN relates to a well-known key value of the expiry timer stored therein. The method further includes triggering a clean-up of stale PHDL object containers from a server memory based on a difference of the new SGN and the previous SGN being greater than the timeout maximum number else preserving the PHDL object container and updating the well-known key value.

The disclosed protocols contain provisions for defining the lifetime of PHDL-info, after which the server may delete these data and may not honor the clients' re-connections requests for timed-out file-handles. This reduces memory consumption on the storage server.

This disclosure describes a system and method for storing the persistent-handle info on a file-system. The present document refers to the ZFS (Zettabyte File System) filesystem for most of the examples, but the principles described herein may also be applied to any other file-system. For instance, the present disclosure may also apply to Samba or Server Message Block protocol used by Microsoft Windows network file system.

System of Storing Persistent-Handle-Info

For making any information available to all storage-nodes, it must either be broadcasted to all nodes or stored at a shared location. The latter approach has significant advantages like atomicity of transactions, simpler failure handling and distributed responsibility. This can be further optimized by storing the persistent-handle-info along with the file-system information, so that whichever storage node takes control of the file-system after a primary-node failure also gains access to the persistent-handle-info.

For storing the persistent-handle-info, a new filesystem-object, referred to as a PHDL-container hereafter, is created for each file. A filesystem-object type that can provide an API (application program interface) for accessing its contents as a key-value list is an ideal choice, if supported by the file-system. In the case of the ZFS filesystem, ZAP (ZFS attribute processor) type file-objects are used to store variable-length key-value pairs as their content. These PHDL-containers are associated with their corresponding file-object to be opened by the client through file-attributes or extended-attributes. For creating the association, a new attribute containing the Mode-number of each PHDL-container is stored with the file being opened. The Mode is a data structure in a Unix-style file system which describes a filesystem object such as a file or a directory. Each Mode stores the file attributes such as its size, owner, device node, socket, pipe, etc and disk block location(s) of the object's data but not its name and actual data. A directory contains an entry for itself, its parent, and each of its children.

Figure 2:
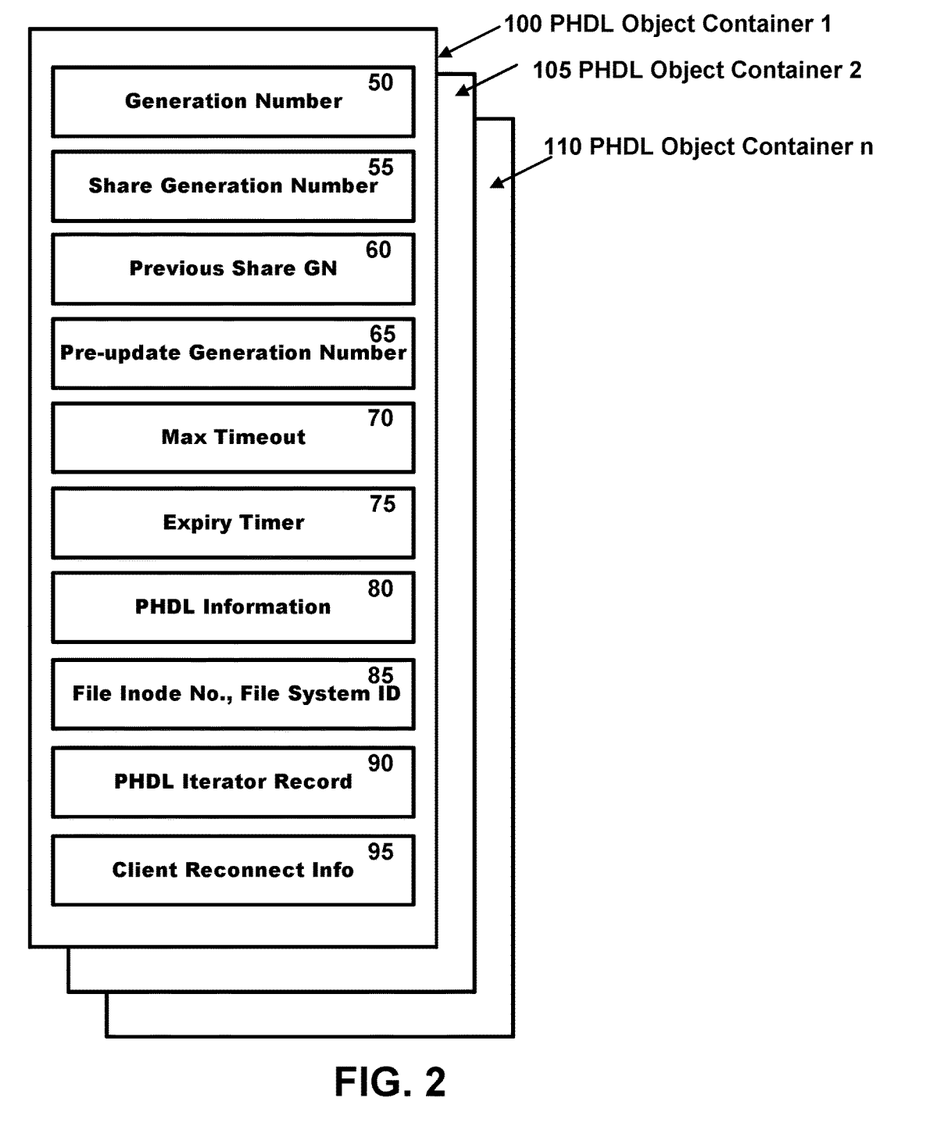
FIG. 2 is a block diagram of some of the register components of a PHDL object container including extended file attributes in accordance with an embodiment of the present disclosure.

FIG. 2 is a block diagram of some of the register components of a PHDL object container including extended file attributes in accordance with an embodiment of the present disclosure. The PHDL object container therefore includes a generation number (GN) 50, a share GN (SGN) 55, a previous SGN 60, a pre-update GN 65, a max timeout value 70, an expiry timer 75, PHDL info 80, a File Inode number and a File System number 85, a PHDL Iterator Record 90 and Client Reconnect information 95. A PHDL object container is associated with each file in a memory share volume and thus a first PHDL object container 100, a second PHDL object container 105, and further PHDL object containers up to n PHDL object containers may be created for a memory share volume as depicted.

Figure 3:
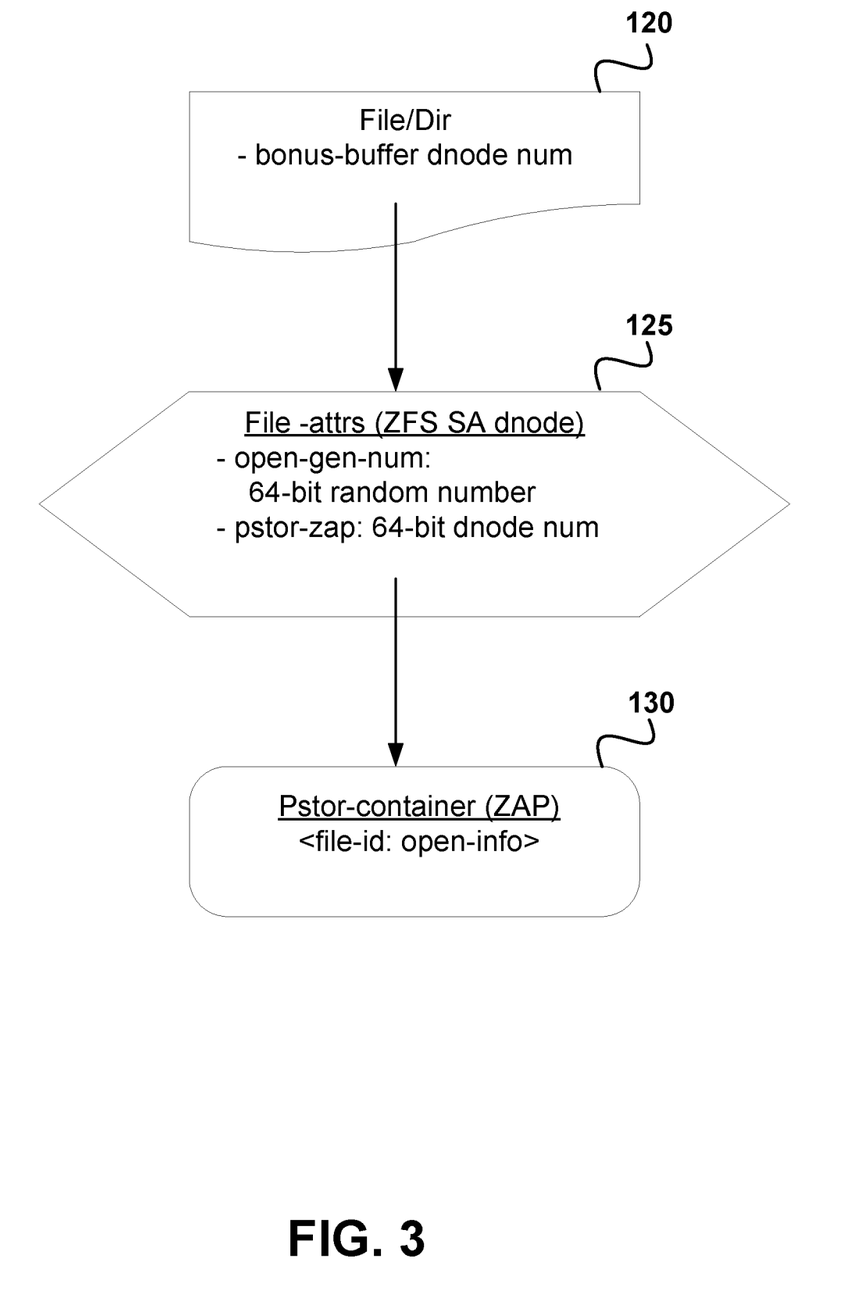
FIG. 3 depicts the association of a ZAP PHDL-container to a file-object in ZFS according to an embodiment of the present disclosure.

FIG. 3 depicts the association of a ZAP PHDL-container to a file-object in ZFS in accordance with an embodiment of the present disclosure. The file/directory 120 includes a bonus-buffer dnode number. The file—attrs (ZFS SA dnode) 125 includes an open-gen-number comprising a 64-bit random number and it includes a pstor-zap register containing a 64-bit dnode number. The Pstor-container (ZAP) 130 includes a file-id comprising open-information.

Once a PHDL-container is associated with a file, it can be populated with records of PHDL-info keyed against the file-handle for each client open upon successful client open operations. For supporting re-connections, the PHDL-container is looked up with the client's file-handle and PHDL-info is retrieved. However, a mechanism is needed to distinguish disconnected PHDL-info from already connected ones. Client disconnections can occur due to storage node restarts, client node restarts or network failures. In the latter two cases, the server's in-memory PHDL-info cache is updated to identify disconnected file-handles. However, for the first case, a PHDL-container must provide a way for identifying disconnected file-handles. For this, three generation-numbers are maintained.

Share-generation-number: This is a volume-level generation number which is a timestamp of the instant a volume is exported to clients, i.e. at the time of making the volume online or at the time of restarting the network-share service on the server.

PHDL-container generation number: This is a per-file generation number stored as a file-attribute or extended-attribute of the opened file, in similar manner to storing the inode-number of a PHDL-container as a file-attribute.

Share-previous-generation-number: This is a volume-level generation number which contains the last known share-generation-number value for which the PHDL-expiry procedure must be started or in progress.

As PHDL-info is a finite-lifetime data, it must be deleted upon expiry for conserving server resources. Hence, an effective mechanism is needed to iterate over all available PHDL-containers in a volume. For supporting this, a per-volume file-system key-value list type object is created and associated to root-inode/super-block of the file-system. This object, referred to as PHDL-iterator, contains a list of entries with following format. Key: Inode number of the file. Value: max-expiry time of all PHDL-info for a file in the key.

In order to maintain a single timer value for each volume, a maximum timeout value for PHDL-iterator entries is stored against a well-known key in the PHDL-iterator.

Further, as the PHDL-container is a bona-fide filesystem-object, it will undergo copying/reference-addition whenever the share-volume is snapshotted. If this snapshot is re-exported as a new share, the inherited PHDL-info can cause problems when clients try to connect to the files in the exported snapshot volume. To prevent this, a globally unique file-system ID is used. In case of ZFS, the ds_guid field of the dataset is used. In case this field is not available, a universally unique identifier must be generated and stored as a part of the super-block information for the file-system. For the files with associated PHDL-containers, a fourth file-attribute/extended-attribute is created for storing the file-system ID.

Figure 4:
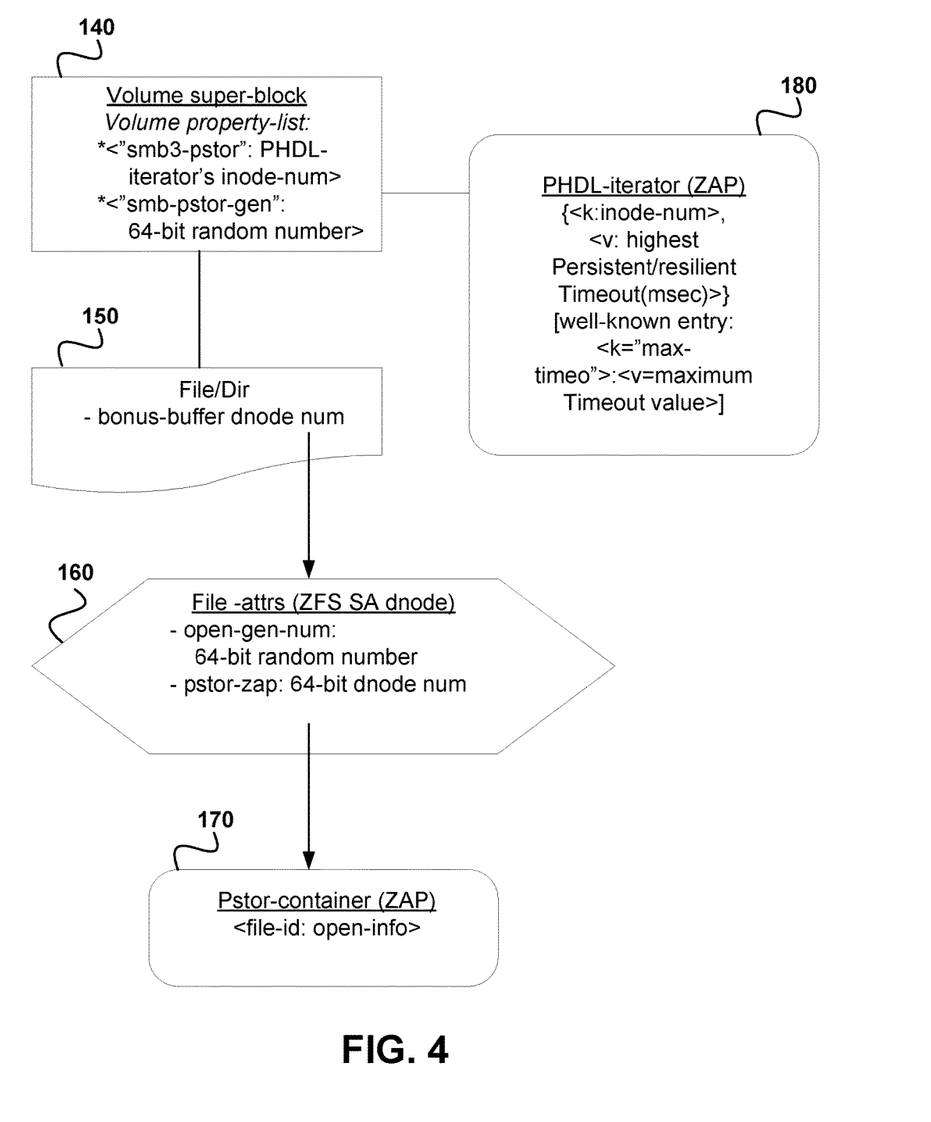
FIG. 4 illustrates all the data-elements that comprise the system for storing PHDL-info, using the ZFS filesystem as an example in accordance with an embodiment of the disclosure.

FIG. 4 illustrates all the data-elements that comprise the system for storing PHDL-info, using the ZFS filesystem as an example in accordance with an embodiment of the disclosure. The Volume super-block 140 is a volume property-list including the smb3-pstor comprising the PHDL-iterator's Mode-number and the smb-pstor-gen comprising a 64-bit random number. The file/directory 150 includes a bonus-buffer dnode number. The file—attrs (ZFS SA dnode) 160 includes an open-gen-number comprising a 64-bit random number and it includes a pstor-zap register containing a 64-bit dnode number. The Pstor-container (ZAP) 170 includes a file-id comprising open-information. The PHDL-iterator (ZAP) 180 includes a k value comprising an inode-num and a v value comprising a highest persistent/resilient timeout(msec) value, and a well-known entry including a k value comprising a max-timeo value also known as a maximum timeout value v.

Method for Using and Managint Persistent-Handle-Info

With the described data-elements in place for the volume and files, the following set of operations is supported on the storage server's nodes. Creation of PHDL-info records: PHDL-info records are added to the file's PHDL-container when a client opens the file. The following tasks are performed during this operation. 1) The storage server receives a file-open request from a client. The request contains the path of the file to be opened and other open related info as discussed before. It checks for existence of the file, client's permissions to perform the desired operations on the file and conflicts with any existing open files. If all these checks succeed, the server generates a new file-handle, a new client context with all the open-related info.

2) The server locates the PHDL-container of the opened file to store the PHDL info. If the PHDL-container does not exist, a new one is created and the following file-attributes of the opened file are updated. The file-attribute for storing PHDL-container's inode-number is updated with the newly created file-object's inode-number. The file-attribute for storing pstor-generation number is updated with the volume's generation number. The file-attribute for storing filesystem-ID is updated with the volume's filesystem-ID.

3) A new record for the PHDL-info is created or updated in PHDL-container.

4) PHDL-iterator is looked up for the record for the opened file. If the record is found and max-timeout is found to be less than the current PHDL-info timeout, the record is updated with new timeout value. If the record is not found, one is created. If the new timeout value is found to be greater than the well-known max-timeout in PHDL-iterator, the latter is updated.

5) If all the above operations succeed, the server sends a successful open response with the newly generated file-handle to the client. In case of failure, the server performs a rollback of any intermediate steps that succeeded.

Deletion of PHDL-info records: PHDL-info records are removed from the file's PHDL-container when a client closes the file or when the PHDL-info expires. For the case of a client file-close request, the request contains the file-handle that needs to be closed. The storage server, on receiving the file-close request, removes any in-memory contexts associate with the file-handle and proceeds with the PDHL-info release procedure listed below. For the case of a PHDL-info expiry, the timeout mechanism specifies the file-handle for which the PHDL-info must be deleted.

The following tasks are performed for releasing the PHDL-info for the file-handle.

1) PHDL-info is looked-up in the PHDL-container using the client's file-handle and deleted if found.

2) If the PHDL-container is empty, its size is checked as some file-systems do not implement file-object shrinking appropriately. If the PHDL-container size is found to exceed a certain limit, it is deleted. Preserving the PHDL-container, when its size is within an acceptable range, helps reduce the file-object creation and deletion frequency.

3) If the PHDL-container is deleted: A file's attribute for storing the Mode-number of PDHL-container is reset, a file's attribute for storing the generation-number is reset, a file's attribute for storing the filesystem-ID is reset and a PHDL-iterator's record corresponding to the file is deleted.

Client re-connection: The storage server receives a client re-connection request, which contains the file-handle that must be resuscitated. It looks up the PHDL-info against the given file-handle in the PHDL-container of the file to be opened. If the record is found, the server re-creates the in-memory context for the client's request to open the file using the PHDL-info and sends a successful response to the client; else a failure response is sent to the client. In addition, the corresponding PHDL-container generation number is updated to the value of current share-generation-number, to signify that this PHDL-container contains at least one PHDL-info record which is currently in use.

PHDL-info expiry: The PHDL-info objects are deleted once they expire by determining if these have been disconnected for more than their lifetime. The three generation-numbers described in the previous section are used to determine if a PHDL-info is connected.

During the share-export time, 1) The PHDL-iterator is looked up for the well-known max-timeout record. 2) The share-generation-number is stored in an in-memory variable called pre-update-generation-number. The Share-generation-number is then updated with the current timestamp value.

3) If the share-previous-generation-number is not set or is equal to a pre-update-generation-number, then it is set to the previous share-generation-number value. For a newly created volume, this is set to the value of the current generation-number. It will be reset to the share-generation-number on successful completion of a PHDL-expiry procedure.

4) If the share-previous-generation-number is already set and is not equal to the pre-update generation-number, this indicates that a PHDL-expiry procedure was pending or in progress at the time when the volume went offline. This can happen if the storage-node malfunctions or when the volume is migrated from one storage node to another, typically for node maintenance. However, if many such migrations occur for the same volume within a small duration of time, this can prevent the PHDL-expiry procedure to complete successfully or even start.

The following scheme helps clean up the PHDL info effectively. If the difference of the share-previous generation number and the share-generation-number is greater than the max-timeout value, this signifies that a PHDL-expiry procedure was in progress previously or should have been started, but was not because of volume going offline. In this case, an asynchronous PHDL clean-up procedure is started immediately, as explained below. If the difference of the share-previous generation number and the share-generation-number is less than the max-timeout, it indicates that a PHDL-expiry was previously pending but had not yet started. In this case the PHDL-clean-up is deferred to the regular PHDL-expiry procedure scheduled below.

5) A timer is started with the max-timeout value. On timer-expiry, the PHDL-expiry procedure is started.

Following are steps for the PHDL-clean-up procedure started in step 4, or for PHDL-expiry started on timer-expiry in step 5. The PHDL-iterator is iterated over and the following operations are performed for each record: The PHDL-container's generation-number file-attribute is retrieved for the file in the PHDL-iterators' record key from the file's attribute.

For determining that the PHDL-container contains at least one PHDL-info record which is currently active, the PHDL-generation-number is compared with the share-generation-number or share-previous-generation-number.

For a PHDL-clean-up operation, the PHDL-container-generation-number is compared with the share-previous-generation-number. If the former is less than the share-previous-generation-number, the PHDL-generation-number is marked for deletion. For a PHDL-expiry procedure, the PHDL-container is marked for deletion if the PHDL-container-generation-number is less than the share-generation-number.

The following steps are performed for deleting the PHDL-container. This record is deleted from the PHDL-iterator. The PHDL-container for the file is also deleted. The File's attribute for storing an Mode-number of the PDHL-container is reset. The file's attribute for storing a generation-number is reset. Also, the file's attribute for storing the filesystem-ID is reset.

On completion of a PHDL-clean-up or expiry procedure, the share-previous-generation-number is updated to pre-update-generation-number or share-generation-number respectively. If the expiry-timer fires while a PHDL-clean-up is in progress, the PHDL-expiry is not started. The share-previous-generation-number is updated to share-generation-number and the PHDL-clean-up procedure is signalled to start-over again by re-iterating over the PHDL-iterator.

Managing stale-PHDL info in snapshots: Stale PHDL-info is detected by comparing the filesystem's ID against the value of a file-attribute containing the stored filesystem-ID during each operation over the PHDL-container. If these two IDs match, the existing PHDL-container is considered valid, else it is deleted and a new one is created, if required, by the operation.

Figure 5:
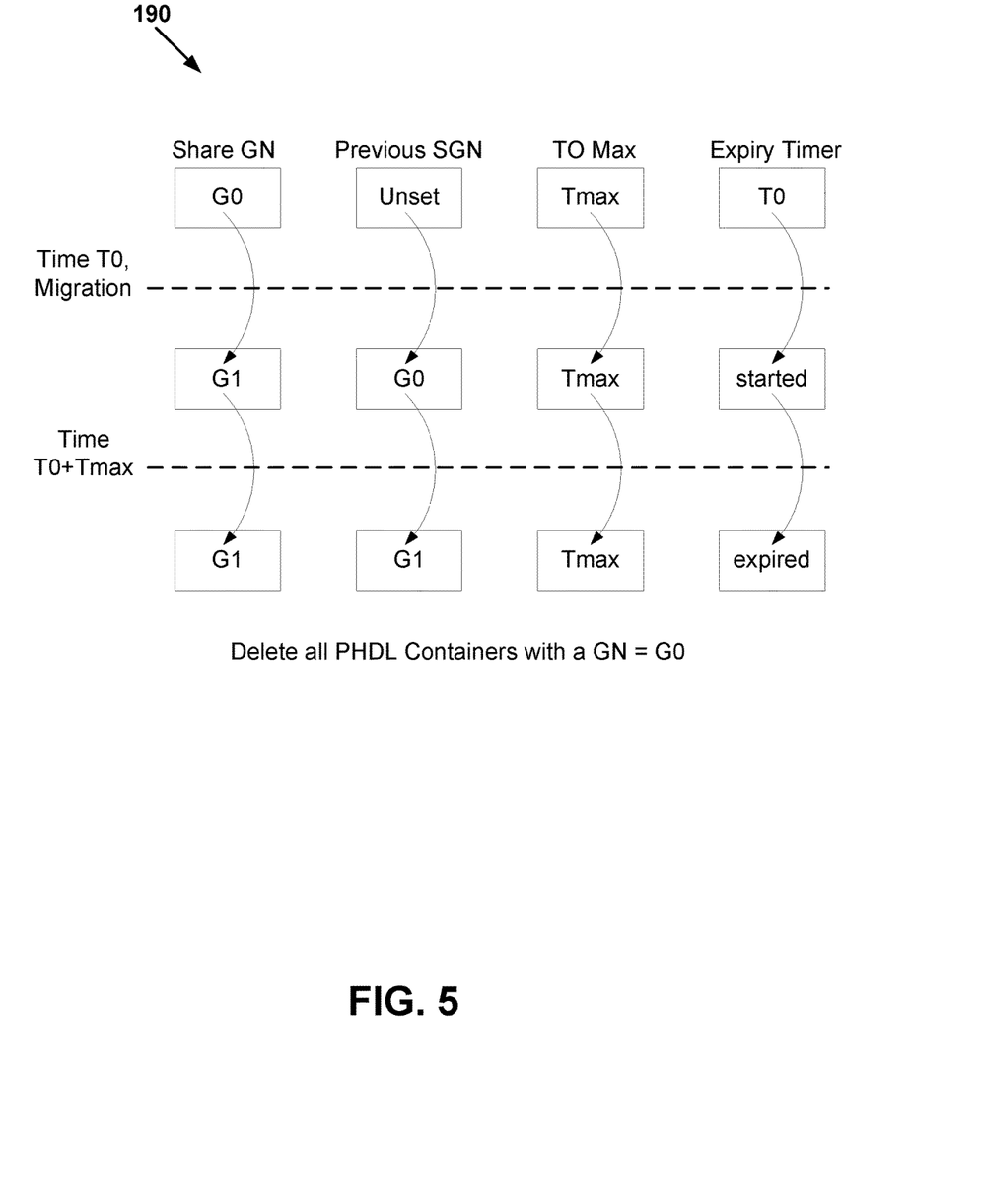
FIG. 5 illustrates a first PHDL-clean-up and expiry scenario where the share volume dataset is brought up prior to the Tmax timeout according to an embodiment of the disclosure.

FIG. 5 illustrates a first PHDL-clean-up and expiry scenario where the share volume dataset is brought up prior to the Tmax according to an embodiment of the disclosure. Assume that a 'V' volume with a share-generation-number 'G0' and an unset share-previous-generation-number contains multiple files with PHDL-containers associated to them. The PHDL-containers have 'G0' as their generation-number. The max-timeout value of this volume is 'T-max'. At time 'T0', the volume undergoes a migration.

Case I: Single Volume Migration 190:

After the volume migration, the share-generation-number is updated to 'G1' and share-previous-generation-number is set to 'G0'. As the share-previous-generation-number was unset previously, the PDHL-clean-up procedure is not triggered. A timer is started for 'T-max'. The clients re-connect with some of the file's PHDL-info, which updates the generation-numbers of their PHDL-containers to 'G1'. At 'T2' (T0+T-max), the timer expires and all the PHDL-containers with generation-number 'G0' are deleted.

Figure 6:
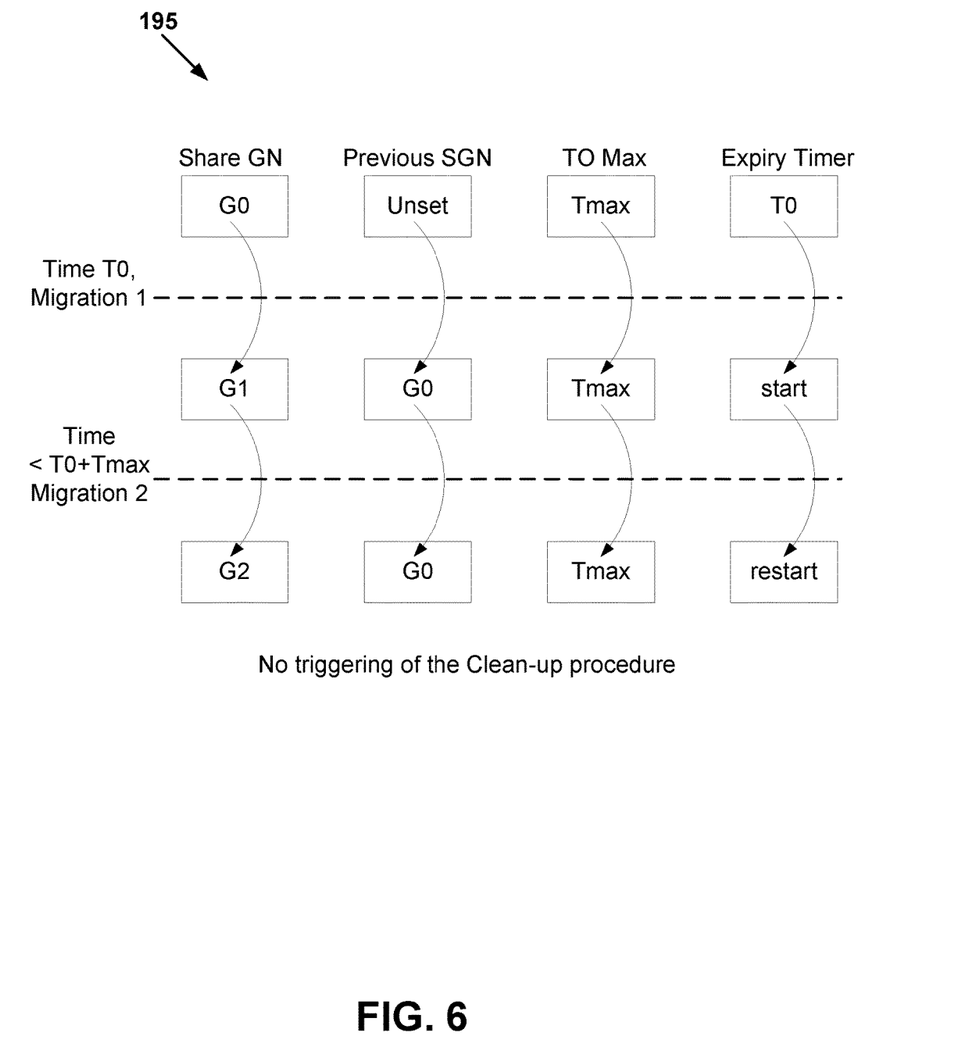
FIG. 6 illustrates a second PHDL-clean-up and expiry scenario where the share volume dataset is brought up prior to the Tmax timeout and a cleanup is interrupted according to an embodiment of the disclosure.

FIG. 6 illustrates a second PHDL-clean-up and expiry scenario where the share volume dataset is brought up prior to the Tmax timeout and a cleanup is interrupted according to an embodiment of the disclosure. After each migration (G1) the cleanup timer (T0+Tmax) will be fired if there are outstanding open files. The subsequent migration (G2) prior (current<(T0+Tmax) to the cleanup expiration will interrupt the G0 cleanup. The interrupted cleanup state (Previous SGN G0) should be not overwritten with G1. The previous SGN state should be retained till the successful cleanup.

Case II: Multiple Volume Migrations, without PHDL Clean-Up 195:

After the volume migration, the share-generation-number is updated to 'G1' and share-previous-generation-number is set to 'G0'. As the share-previous-generation-number was unset previously, the PDHL-clean-up procedure is not triggered. A timer is started for 'T-max'. However, before the timer could expire, the volume undergoes another migration. Following this, the share-generation-number is updated to 'G2'.

Figure 7:
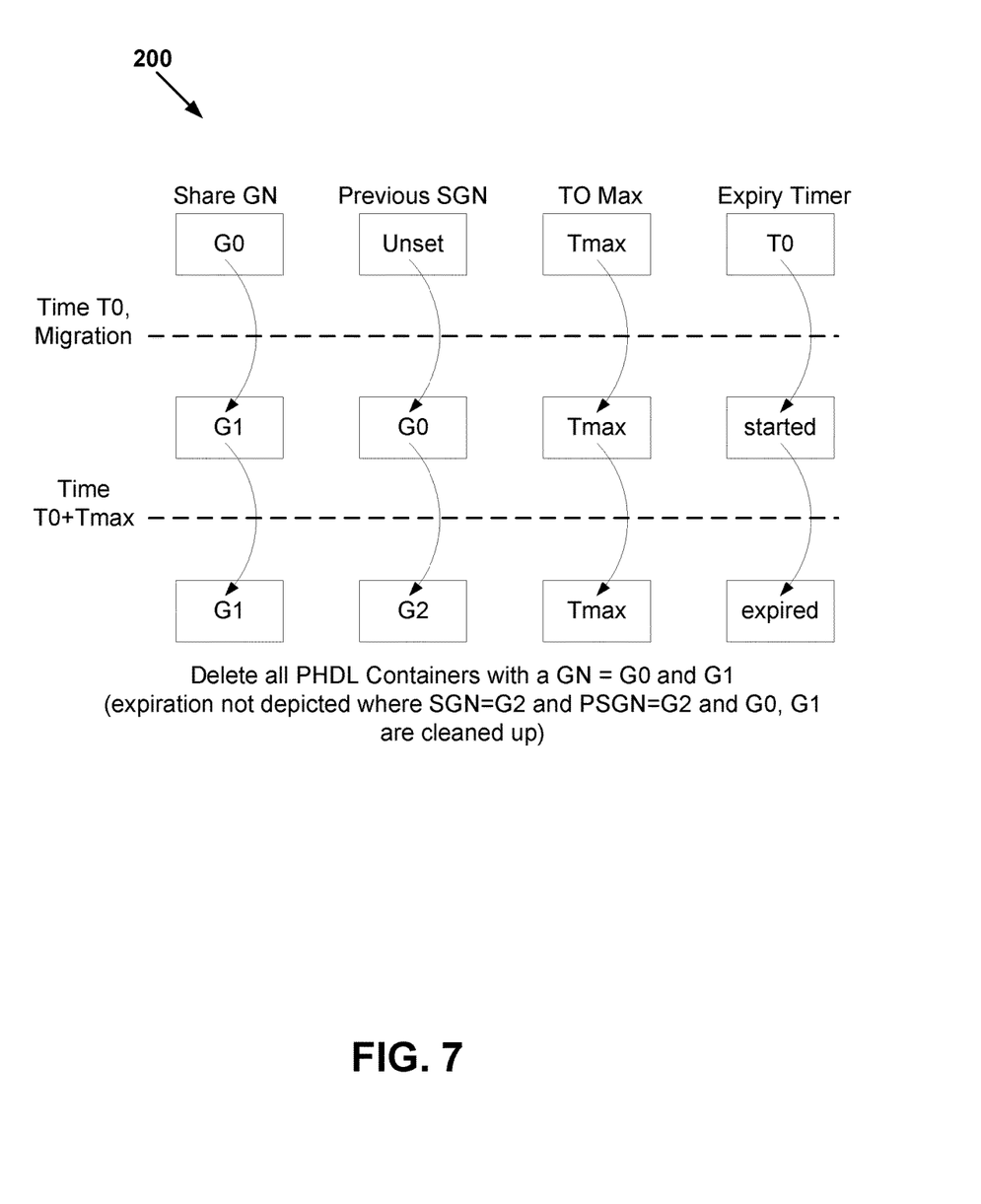
FIG. 7 illustrates a first PHDL-clean-up and expiry scenario where the share volume dataset is brought up prior to the Tmax timeout and SGN is increasing the sequence number according to an embodiment of the disclosure.

FIG. 7 illustrates a first PHDL-clean-up and expiry scenario where the share volume dataset is brought up prior to the Tmax timeout and SGN is increasing the sequence number according to an embodiment of the disclosure. The SGN is increasing the sequence number and can't go back. Another expiration event, not depicted, cleans up both G0 and G1 where SGN is G2 and PSGN will be G2.

Case II-a: With PHDL-Expiry Only 200:

Assume that the difference of the new share-generation-number 'G2' and the share-previous-generation-number 'G0' is not greater than 'T-max', so a PHDL-clean-up is not triggered. When the PHDL-expiry timer expires, all the PHDL-containers with generation-numbers 'G0' and 'G1' are deleted and the share-previous-generation-number is set to 'G2'.

Figure 8:
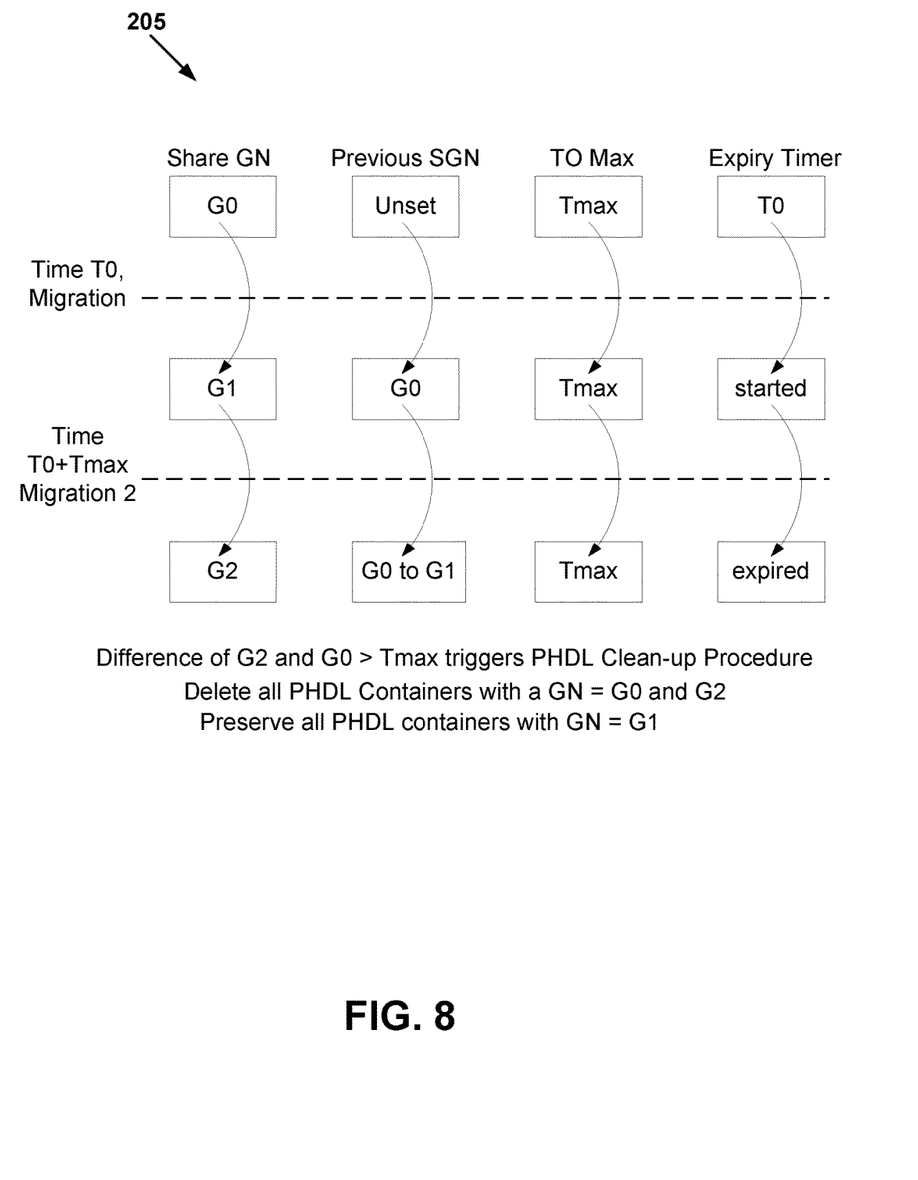
FIG. 8 illustrates a first PHDL-clean-up and expiry scenario where the share volume dataset is brought up after the Tmax timeout according to an embodiment of the disclosure.

FIG. 8 illustrates a first PHDL-clean-up and expiry scenario where the share volume dataset is brought up after the Tmax timeout according to an embodiment of the disclosure.

Case II-b: With PHDL-Clean-Up and PHDL-Expiry 205:

In case the difference of 'G2' and 'G0' was greater than 'T-max', the PHDL-clean-up procedure will be started and the last share-generation-number 'G1' will be stored as the pre-update-generation-number. During PHDL-clean-up, all the PHDL-containers with a generation-number as 'G0' are deleted and the share-previous-generation-number is updated to the pre-update-generation-number 'G1'. Note that during PHDL-clean-up, all the PHDL-containers with generation-numbers as 'G1' are preserved because it is unclear whether they have remained disconnected to more than T-max time, because 'G1' represents the time when the PHDL-info in these PHDL-containers were created or re-connected.

When the PHDL-expiry-timer expires, all the PHDL-containers with generation-numbers not equal to 'G2' are deleted. In case the PHDL-clean-up is interrupted by another volume migration, the same procedure would be repeated on the new storage node as the new share-generation-number 'G3' would definitely be greater than share-previous-generation-number 'G0'.

If the volume migration occurred during the PHDL-expiry procedure (after the timer expiry), the new share-generation-number 'G3' would once again be greater than pre-update-generation-number 'G2' as the expiry-time 'T-max' is known to have elapsed. As 'G2' is known to be greater than share-previous-generation-number 'G1', it follows that 'G3' is greater than 'G1'; hence a new PHDL-clean-up will be started on new storage node.

If the volume migration occurred after the PHDL-clean-up but before the PHDL-expiry, the new share-generation-number 'G3' may or may not be greater than the share-previous-generation-number 'G1'. A PHDL-expiry and/or PHDL-clean-up procedure will be started depending on the difference of 'G3' and 'G1'.

An integrated log, cache and metadata intelligent flash architecture comprises four general-purpose arrays and three solid-state arrays, all of which are based on the same hardware and software architecture, and all of which support block and file protocols. The raw capacity of the largest array, the T3400, is relatively small at 314 TB. However, since the Tegile arrays are some of the few general-purpose disk arrays that have in-line compression and deduplication (depending on the data types), the usable capacity can often be several times larger and provide a very competitive price per usable capacity. The data reduction ratios also provide an environmental advantage in terms of power, cooling and physical rack space. The hardware is designed to be simple to maintain, and customers are allowed to add expansion shelves and extra disk capacity, and also to perform software upgrades and apply fixes themselves.

The same hardware, software architecture and technology are used across the entire disclosed storage array portfolio. Selective in-line data reduction and compression allow customers to select data reduction where required and, just as importantly, to disable it for unsuitable workloads. All software features are included in the base price of the storage array.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A method for managing persistent file handles for a server and a client memory, comprising:
    a) starting an expiry timer and creating a Persistent File Handle (PHDL) object container for storing information including extended file attributes for a file based on an association between the file and the PHDL object container, a client's permissions for the file, and an absence of conflicts between the file and other open files in a file system;
    b) storing in the PHDL object container a per-file PHDL-container generation number (CGN) corresponding to the file, a volume-level share generation number (SGN), a new SGN updated with a current timestamp value, a previous SGN which is a volume-level last known SGN value, and a timeout max value for the expiry timer, wherein a SGN is a volume-level timestamp of a volume migration or an online creation in relation to the expiry timer;
    c) creating a PHDL iterator to update the SGNs for every volume exported to clients, creation of the volume online, or at a restarting of a network-share service on the server, wherein each SGN relates to a well-known key value of the expiry timer; and
    d) triggering a clean-up of stale PHDL object containers from a server memory based on a difference of the new SGN and the previous SGN being greater than the timeout max value else preserving the PHDL object container and updating the well-known key value.

2. The method for managing persistent file handles for the server and the client memory of claim 1, further comprising deleting all PHDL object containers with a CGN not equal to the new SGN upon the expiration of the respective expiry timer.

3. The method for managing persistent file handles for the server and the client memory of claim 1, further comprising detecting stale PHDL object containers by comparing a filesystem ID against a value of a file attribute containing a stored filesystem ID during each operation of a PHDL object container.

4. The method for managing persistent file handles for the server and the client memory of claim 1, wherein storing the previous SGN is based on a last known SGN value for which a PHDL expiry procedure is started or in progress.

5. The method for managing persistent file handles for the server and the client memory of claim 1, wherein creating the PHDL iterator further comprises associating a per volume file system key value list type object to a root-inode/super block of the file system including an inode number of a file and the timeout max value of all PHDL info for the file in the key value list.

6. The method for managing persistent file handles for the server and the client memory of claim 1, further comprising creating a single expiry timer value for each volume from the timeout max values of all PHDL entries stored against the well-known key value.

7. The method for managing persistent file handles for the server and the client memory of claim 1, further comprising setting the well-known key value to a greater value of the timeout max value of a file and a current PHDL info timeout.

8. The method for managing persistent file handles for the server and the client memory of claim 1, further comprising removing PHDL info from a file PHDL object container based on a client closing the file or based on the expiration of the PHDL info.

9. The method for managing persistent file handles for the server and the client memory of claim 1, further comprising marking a PHDL object container for deletion based on the CGN being less than the SGN.

10. The method for managing persistent file handles for the server and the client memory of claim 1, further comprising a PHDL-info expiry triggering deletion of a PHDL-info.

11. The method for managing persistent file handles for the server and the client memory of claim 1, further comprising preserving a PHDL object container based on its size being within an acceptable range to help reduce file-object creation and deletion frequency.

12. The method for managing the persistent file handles for the server and the client memory of claim 1, further comprising resetting a file attribute for storing an inode number of the PHDL object container.

13. The method for managing the persistent file handles for the server and the client memory of claim 1, further comprising preserving the PHDL expiry timer in an event the expiry timer fires while a PHDL clean-up is in progress.

14. A computer program product comprising a non-transitory computer readable storage medium having computer useable instruction codes executable to perform operations for managing persistent file handles for a server and a client memory, the operations of the computer program product comprising:
    a) starting an expiry timer and creating a Persistent File Handle (PHDL) object container for storing information including extended file attributes for a file based on an association between the file and the PHDL object container, a client's permissions for the file, and an absence of conflicts between the file and other open files in a file system;
    b) storing in the PHDL object container a per-file PHDL-container generation number (CGN), a volume-level share generation number (SGN), a new SGN updated with a current timestamp value, a previous SGN which is a volume-level last known SGN value, and a timeout max value for the expiry timer, wherein a SGN is a volume-level timestamp of a volume migration or an online creation in relation to the expiry timer;

c) creating a PHDL iterator to update the SGNs for every volume exported to clients, creation of the volume online, or at a restarting of a network-share service on the server, wherein each SGN relates to a well-known key value of the expiry timer; and d) triggering a clean-up of stale PHDL object containers from a server memory based on a difference of the new SGN and the previous SGN being greater than the timeout max value else preserving the PHDL object container and updating the well-known key value.

15. The computer program product of claim 14 wherein the operations of the computer program product further comprise preserving the PHDL expiry timer in an event the expiry timer fires while a PHDL clean-up is in progress.

16. The computer program product of claim 14, wherein creating the PHDL iterator further comprises associating a per volume file system key value list type object to a root-inode/super block of the file system including an inode number of a file and the timeout max value of all PHDL info for the file in the key value list.

17. A system for managing persistent file handles for a server and a client memory, comprising:

a) an expiry timer and a Persistent File Handle (PHDL) object container for storing information including extended file attributes for a file based on an association between the file and the PHDL object container, a client's permissions for the file, and an absence of conflicts between the file and other open files in a file system;

b) a per-file PHDL-container generation number (CGN) register, a volume-level share generation number (SGN) register, a new SGN register updated with a current timestamp value, a previous SGN register for a volume-level last known SGN value, and a timeout max value register for the expiry timer, where each generation number (GN) register stores a timestamp of a volume migration or an online creation in relation to the expiry timer;

c) a PHDL iterator configured to update the SGNs for every volume exported to clients, creation of the volume online, or at a restarting of a network-share service on the server, wherein each SGN relates to a well-known key value of the expiry timer stored therein; and d) a clean-up module configured to trigger a clean-up of stale PHDL object containers based on a difference of the new SGN and the previous SGN being greater than the timeout max value else configured for preserving the PHDL object container and updating the well-known key value.

18. The system for managing persistent file handles for the server and the client memory of claim 17, wherein the clean-up module is further configured to delete all PHDL object containers with a CGN not equal to the new SGN upon an expiration of the respective expiry timer.

19. The system for managing persistent file handles for the server and the client memory of claim 17, wherein the PHDL iterator further comprises a per volume file system key value list type object to a root-inode/super block of the file system including an inode number of a file and the timeout max value of all PHDL info for the file in the key value list.

20. The system for managing persistent file handles for the server and the client memory of claim 17, further comprising a single expiry timer for each volume configured from the timeout max values of all PHDL entries stored against the well-known key value.

\* \* \* \* \*